April 2, 1929.  J. F. O'CONNOR  1,707,362
HAND BRAKE
Filed July 9, 1923
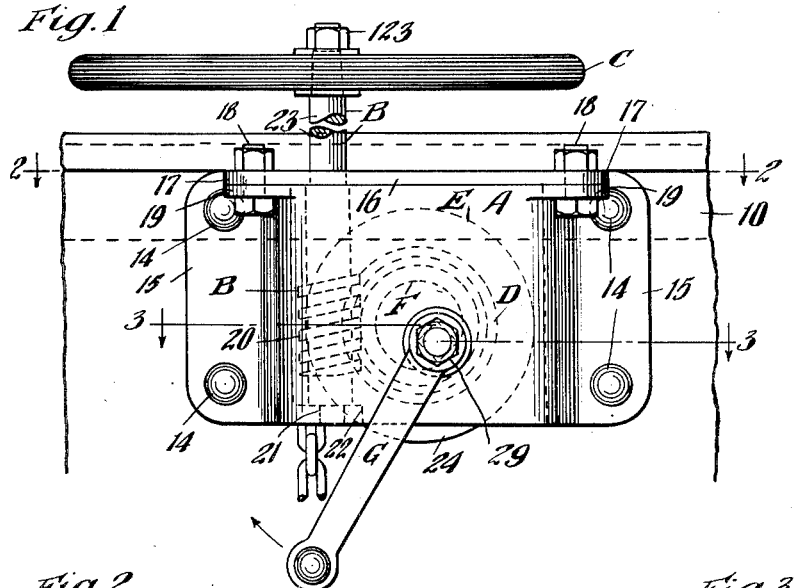
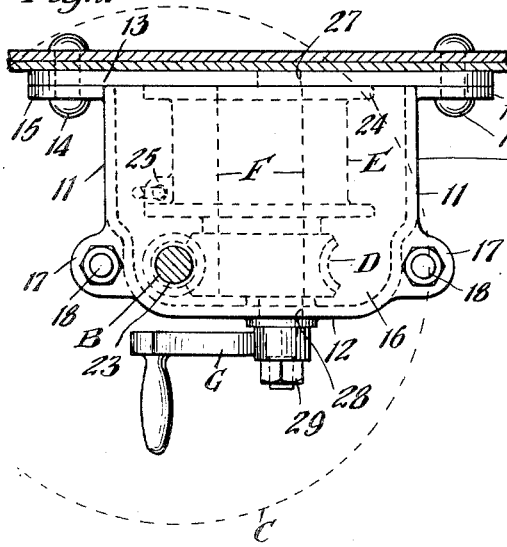
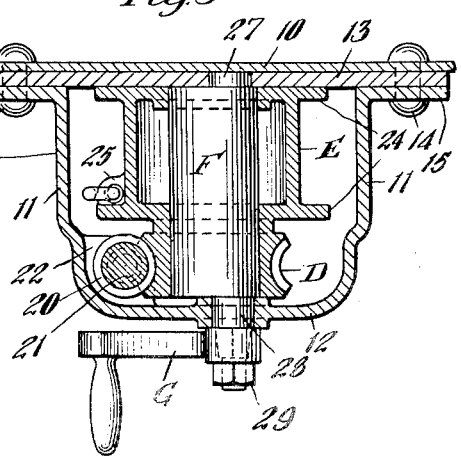
Witnesses
Wm. Geiger
Inventor
John F. O'Connor
By George I. Haight
His Atty.

Patented Apr. 2, 1929.

1,707,362

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

HAND BRAKE.

Application filed July 9, 1923. Serial No. 650,212.

This invention relates to improvements in hand brakes for railway cars.

One object of the invention is to provide a simple and efficient hand brake, wherein high powered pull on the brake chain is had and either a slow graduated or quick full release may be obtained.

Another object of the invention is to provide a hand brake of the worm and worm wheel type, wherein the worm wheel may be disengaged from the worm to effect a quick full release of the brakes.

A more specific object of the invention is to provide a brake of the type indicated, including a hand wheel, wherein manually operated means independent of the hand wheel is provided for disengaging the worm wheel from the worm thereby preventing accidental movement of the hand wheel and of the disengaging means, and assuring against injury to the operator.

Other objects and advantages of the invention will more clearly appear from the description and claims hereinafter following.

In the drawing forming a part of this specification, Figure 1 is an end elevation of a portion of a railroad car, showing my improvements in connection therewith. And Figures 2 and 3 are horizontal, transverse, sectional views corresponding, respectively to the lines 2—2 and 3—3 of Fig. 1.

In said drawing, 10 denotes a portion of an end wall of a car on which my improved hand brake mechanism is mounted.

The improved hand brake mechanism, as shown, comprises, broadly, a housing A; a combined brake staff and worm B; a hand wheel C; a worm wheel D; a winding drum E; an adjustable shaft F; and an adjusting crank G.

The housing A is open at the bottom and has vertically disposed spaced side walls 11—11, a front wall 12 formed integral with the side walls, and a back wall 13 in the form of a flat plate secured to the side walls by rivets 14 passing through the plate and outwardly projecting flanges 15 on the side walls. The rivets 14 also extend through the end wall 10 of the car and serve as means for rigidly securing the housing A in position. The top of the housing A is closed by a cover plate 16 having ears 17 adapted to receive bolts 18 extending through ears 19 laterally projecting from the side walls of the housing, rigidly securing the plate in position.

The combined brake staff and worm B is in the form of a relatively short shaft having, near the lower end thereof, an integral worm portion 20 adapted to mesh with the worm wheel D. The lower end of the shaft B is provided with a reduced cylindrical journal 21 journaled in a horizontal corner web 22 formed integral with the front and one of the side walls of the housing. The upper end portion of the shaft is slightly reduced as indicated at 23, said reduced portion being journaled in, and passing upwardly through, the cover plate. It will be seen that the cover plate thus serves to hold the staff in proper assembled relation and against upward displacement by engagement thereof with the shoulder formed between the main portion of the staff and the reduced upper end portion. The staff B is provided with the usual hand wheel C rigidly secured thereto, the hub of the wheel being provided with a tapered opening of square cross-section adapted to receive the correspondingly tapered, square upper end of the staff. The hand wheel is securely held in position by a clamping nut 123.

The winding drum E is in the form of a hollow spool having annular side flanges 24, one of which is provided with an integral perforated lug 25, to which one end of the brake chain is secured, the opposite end of the chain being secured to the brake mechanism proper. The drum E is freely rotatable on the adjustable shaft F and is adapted to be driven by the worm wheel D secured thereto.

The shaft F is provided with alined, eccentric trunnions 27 and 28 at the front and rear ends thereof, journaled respectively in the front wall 12 and the rear wall 13 of the housing. The trunnion 28 projects outwardly beyond the front wall 12 of the housing and has the crank G rigidly secured thereto, the crank being provided with a tapered opening of square cross section adapted to receive the correspondingly tapered, square outer end portion of the trunnion 28 and is held in position by a clamping nut 29. It will be evident that upon rotating the shaft F in either direction by means of the crank G, the worm wheel D will be adjusted toward and away from the worm 20.

In the drawing, the shaft F is shown adjusted to a position where the worm wheel D is in mesh with the worm 20. With the parts in this position, upon rotation of the hand wheel in a clock-wise direction the inter-engaging worm and worm wheel will effect rotation of the winding drum E in the proper direction to wind the chain thereon and tighten the brakes. Reverse rotation of the drum and unwinding of the chain is prevented due to the friction existing between the worm wheel and the worm, and means, such as is commonly provided comprising a pawl and ratchet for locking the brake staff in position, is therefore unnecessary.

To effect a slow and graduated release of the brake, the hand wheel is rotated in a contra-clock-wise direction. To effect a quick release of the brake, the crank G is turned in the direction indicated by the arrow in Fig. 1, thereby rotating the shaft F on the eccentric trunnions 27 and 28, moving the worm wheel D and the drum E bodily away from the worm 20, and entirely disengaging the worm wheel from the worm, whereupon the drum E will be free to rotate on the shaft F, permitting the brake chain to unwind. Upon reference to Fig. 1 it will be seen that the eccentric trunnions of the shaft F are so positioned with reference to the latter that there will be a slight upward movement of the worm wheel D with reference to the worm 20 in addition to the movement of the formed away from the latter.

To re-engage the worm wheel and worm for the next brake setting operation, the crank G is rotated in a direction reverse to that just described, thereby rotating the eccentric shaft F in a reverse direction also and adjusting the worm wheel toward the worm.

From the preceding description taken in connection with the drawing, it will be evident that, inasmuch as the drum and worm wheel are freely rotatable on the eccentrically mounted shaft, there is no tendency, during the release of the brakes, for the shaft and the operating crank carried thereby to rotate with the drum, thus preventing injury to the operator. It will also be evident that the hand wheel remains stationary at all times during the quick release of the brakes, due to the worm wheel being moved away from the worm, and that the operator may therefore, without danger of injury, steady himself by gripping the hand wheel with one hand while operating the release crank with the other hand.

The tension in the brake chain tends to hold the worm and wheel in mesh, and as this tension increases, this holding force also increases.

I have herein shown and described what I now consider the preferred manner of carrying out the invention, but the same is merely illustrative and I contemplate all changes and modifications that come within the scope of the claims appended hereto.

I claim:

1. In a hand brake, the combination with a vertically disposed rotary brake staff, having a worm portion formed integral therewith; of a brake winding drum having a worm wheel rigid therewith; an eccentrically mounted shaft on which said drum and wheel are freely rotatable; and manually operated means for rotating said shaft on its eccentric mounting to alternately engage and disengage the worm and worm wheel.

2. In a hand brake, the combination with a housing adapted to be mounted upon the car structure, adjacent the upper portion thereof; of a rotary staff journaled in said housing and provided with a worm; a winding drum having a worm wheel rigid therewith, said drum and worm wheel being rotatably mounted upon an eccentric shaft journaled in said housing; and means connected to said shaft and operable to move said drum and said worm wheel into and out of co-operative relation with said worm.

3. In a hand brake, the combination with a winding drum; of operating means including a worm and a worm wheel for rotating said drum, said worm wheel being fixed to the drum and rotatable on the same axis as the drum; means for rotatably supporting said drum and worm wheel, said supporting means being so mounted as to be displaceable toward the worm by the pull on the brake chain, thereby urging said worm wheel toward engagement with the worm; and manually operated means for adjusting said supporting means to disengage the worm wheel from the worm to release the brakes.

4. In a hand brake, the combination with a winding drum for the brake chain, said drum being displaceable; of worm elements for rotating said drum, one of said elements being rotatable on a fixed axis and the other of said elements being connected to the drum movement in unison therewith; means for rotatably supporting said drum and connected worm element, said supporting means being displaceable toward the worm element which is rotatable on a fixed axis and the chain being wound on the drum in a direction to exert a pull on the drum to displace the supporting means and the element movable therewith toward the other element; and manually operated means for adjusting the supporting means and the drum to engage and disengage said worm elements for respectively rendering the brake mechanism operative to effect rotation of the drum and to release said drum.

In witness that I claim the foregoing I have hereunto subscribed my name this 6th day of July 1923.

JOHN F. O'CONNOR.